United States Patent
Pedersen et al.

(12) 
(10) Patent No.: US 11,022,539 B2
(45) Date of Patent: Jun. 1, 2021

(54) MASKING OF IMAGES OF BIOLOGICAL PARTICLES

(71) Applicant: ChemoMetec A/S, Allerød (DK)

(72) Inventors: Rune Troelsgaard Pedersen, Copenhagen (DK); Søren Kjærulff, Hillerød (DK)

(73) Assignee: ChemoMetec A/S, Allerød (DK)

( * ) Notice: Subject to any disclaimer, the term of this patent is extended or adjusted under 35 U.S.C. 154(b) by 90 days.

(21) Appl. No.: 16/478,194

(22) PCT Filed: Jan. 22, 2018

(86) PCT No.: PCT/EP2018/051441
§ 371 (c)(1),
(2) Date: Jul. 16, 2019

(87) PCT Pub. No.: WO2018/134402
PCT Pub. Date: Jul. 26, 2018

(65) Prior Publication Data
US 2019/0369003 A1    Dec. 5, 2019

(30) Foreign Application Priority Data
Jan. 20, 2017 (DK) .............................. PA201700044

(51) Int. Cl.
*G01N 15/14* (2006.01)
*G01N 21/64* (2006.01)

(52) U.S. Cl.
CPC ......... *G01N 15/1475* (2013.01); *G01N 21/64* (2013.01)

(58) Field of Classification Search
CPC .... G06T 7/10; G06T 7/12; G06T 7/13; G06T 7/90; G06T 2207/10064; G06T 2207/30024; G01N 15/1468; G01N 2015/1472; G01N 15/1475; G01N 21/64; G01N 21/6428; G01N 21/6456; G01N 21/6458; G01N 21/6486
See application file for complete search history.

(56) References Cited

U.S. PATENT DOCUMENTS

| | | | |
|---|---|---|---|
| 5,736,410 A * | 4/1998 | Zarling et al. ......... | B82Y 15/00 250/458.1 |
| 2005/0002552 A1 | 1/2005 | Dunn et al. ................... | 382/133 |
| 2011/0274337 A1 | 11/2011 | Hunter et al. ................ | 382/133 |
| 2014/0193892 A1 | 7/2014 | Mohan et al. ..... | G01N 21/0303 |

FOREIGN PATENT DOCUMENTS

WO    WO2014/127372 A2    8/2014

OTHER PUBLICATIONS

Edward, R., Red/Far-Red Fluorescing DNA-Specific Anthraquinones for Nucl:Cyto Segmentation and Viability Reporting in Cell-Based Assays, Methods in Enzymology, 505: 23-45, 2012.

* cited by examiner

*Primary Examiner* — Andrew W Johns
(74) *Attorney, Agent, or Firm* — Julie K. Staple; Dinsmore & Shohl LLP

(57) ABSTRACT

The current invention relates to the task of masking, i.e. determination of boundaries in an image of biological particles and/or elements or parts of biological particles in image cytometry. Methods for masking of a biological particle or element or region of a biological particle in a sample are provided which include staining a first element or region of the biological particle with a first fluorescent dye, staining a second element or region of the biological particle with a second fluorescent dye, recording an image of the fluorescent light signal emitted from the sample, and determining boundaries of the biological particle or element or region of the biological particle based on the fluorescent light signal in the image.

21 Claims, 13 Drawing Sheets

Maleimide-Abberior-635 CAGE
+ RedDot™2

MASKING OF IMAGES OF BIOLOGICAL PARTICLES

FIELD OF THE INVENTION

Current invention relates to the task of masking, i.e. determination of boundaries in an image of biological particles and/or elements or parts of biological particles in image cytometry.

DESCRIPTION OF THE RELATED ART

Fluorescent microscopy is an essential tool in the field of biology. The ability to visualize the precise distribution of biomolecules within a single cell and the nucleus has provided scientist with vital information of cellular mechanisms for many decades. However most fluorescent microscopy based assays are very labour intensive and demand operators with specialised training. Thus a high demand for automated fluorescent microscopes (image cytometers) and automated analysis exists. Several systems for automated image acquisition have been developed and are available that can generate vast amounts of image data. The major bottleneck within the field of image cytometry is correct identification and/or segmentation of single cells and/or their nuclei in the acquired images. Several studies have focused on this problem which in general can be divided into two approaches.

The first approach relies on determining the cellular compartments and/or cell outline by light microscopy images, such as bright field, phase contrast and differential interference contrast (DIC), and the light microscopy images may further be combined with a fluorescence image of the nucleus stained with a fluorescent dye. For suspension cells this approach is often reliable, however images of adherent cells have limited contrast at the cell boundary under these conditions. This is further complicated in many assays depending on fixation of the cells which often further reduces the cellular contrast.

The second approach is based on staining the cytoplasm and the nuclei with two or more spectrally different fluorescent dyes. This method often enables segmentation of the cells and nuclei or other cellular elements. However, a limiting parameter in image cytometry is the number of available excitation light sources and emission filters. Thus the use of two or more spectrally different fluorescent dyes, to detect the cytoplasm and the nuclei, greatly limits the number of fluorescent channels available for analysis of samples of biological particles and thus leads to a reduced data output.

SUMMARY OF THE INVENTION

The previous methods of masking biological particles have greatly suffered from complex protocols and lack of contrast and/or limitation in the number of free fluorescent excitation/emission channels, thus resulting in tedious processes with inadequate performance and limited data output. Embodiments of the present invention offer several novel and inventive approaches to the problem. Many preferred embodiments of the present invention include a fluorescent-based method which, based on only one excitation light source, allows masking of individual biological particles and/or elements or regions of biological particles such as the nucleus and the cytoplasm, thus maximising the available fluorescence excitation/emission channels of the image cytometer for the analysis of biological particles, elements or regions of such particles and thus increases possible data output of the system.

Several preferred embodiments of the present invention relate to a method for masking of a biological particle and/or element or region of a biological particle in a sample. In one embodiment of the invention, the method comprises the steps of 1) staining at least one element or region of the biological particle with at least one fluorescent dye, 2) placing the sample in an image cytometer, 3) illuminating the sample with light, where the illumination light generates fluorescent emission from the at least one fluorescent dye, 4) recording an image of the fluorescent light from the sample, and 5) using the fluorescent light signal in the image to determine boundaries of the biological particle and/or element or region of the biological particle. This method makes it possible to identify and analyse biological particles and/or elements or regions of biological particles in images recorded of the sample.

In several preferred embodiments of the present invention a single illumination light source is used to generate fluorescent light. In several of these embodiments the fluorescent light intensity is used to determine the boundary of two or more elements or regions of at least one biological particle. In some embodiments the brightness and/or contrast of the image is adjusted such that the boundary of the two or more elements or regions of the biological particle may be distinguished in one image. Such embodiments often allow discrimination and/or identification of individual biological particles of same or similar species. Further the embodiments allow discrimination and/or identification of individual elements and/or regions of biological particles. Several of these embodiments use a single image of fluorescent information while other embodiments use two or more images of fluorescent information, in some of which embodiments where two or more of these images show fluorescent light information in substantially different wavelength bands.

The advantage of masking using a single illumination light source offers substantial advantage, for instance with regard to the number of images that have to be recorded and/or the time needed for the analysis and maximizing free fluorescent excitation/emission channels for other use. It is furthermore advantageous to use a single image of the sample for masking of a biological particle, as this lowers the time required for acquiring data and analysing the sample, compared to methods using multiple images. In some embodiments the intensity of fluorescent light from the sample is used for determining boundaries in the image. Such embodiments are suited for analysis of a single fluorescence image of the sample.

In several preferred embodiments two or more images of the fluorescent light from the sample are recorded and the fluorescent light signal in said two or more images is used to determine boundaries of the biological particle and/or element or region of the biological particle. The two or more images may be acquired with the same settings and conditions, or they may be acquired using different filters and/or different camera settings such as shutter speed or light sensitivity. Multiple images may be advantageous for distinguishing regions and determining boundaries in some conditions.

In several preferred embodiments parts and/or elements or regions of the at least one biological particle is stained with two or more fluorescent dyes, preferably where the two or more fluorescent dyes have absorption in at least partly overlapping waveband region(s), such that both/all such fluorescent dyes are able to generate fluorescence when illuminated with light in a single waveband, or preferably a light from a single light source. In many of such embodiments, two or more of the fluorescent dyes emit fluorescence in wavebands which at least partly do not overlap, preferably where at least two images of fluorescent light are recorded, where the at least two recorded images, at least partly, represent fluorescent light intensity in wavebands that do not overlap. Masking using a single illumination light source offers substantial advantage, such as maximizing free fluorescent excitation/emission channels for the user. It is further an advantage of such embodiments that the at least two fluorescent dyes may target different parts and/or elements of the biological particle, which may then be masked separately.

Throughout the present disclosure, masking is to be understood as the process of separating or isolating one or more regions of an image and/or detecting edges or boundaries of one or more regions in an image and/or boundaries between regions, for example a region can be a cell, or part of a cell, such as the cytoplasm, mitochondria, golgi apparatus, lysosome, lipid globules, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of a biological particle. Masking includes separating an image from its background or removing the background of an image. It also includes segmenting an image or selecting or isolating certain portions of an image. This may lead to the image being divided or segmented into two or more regions or it may lead to a single region being isolated from the original image. Separated or isolated regions may be assigned certain values. For example, an isolated background may be given a value of zero or a selected background value. For images with multiple isolated regions, each region may be assigned different values. Masking may further include outlining one or more regions of an image to determine the edge or boundary of the regions.

Furthermore, the terms waveband and wavelength band are used throughout the disclosure for a range of electromagnetic wavelengths or frequencies substantially located between two given limits. These electromagnetic wavelengths include light in the visible spectrum as well as ultraviolet light and infrared light.

The term staining is used for describing the technique used in microscopy to enhance contrast in microscopic images. This technique is frequently used to highlight structures in biological tissues for viewing. Staining may be performed using a single dye to enhance the contrast of the sample or using two or more dyes to enhance the contrast.

Throughout the present disclosure, the term boundary is to be understood as the edge or perimeter of an area or region. This includes the boundary of a cell, particle or element as well as the boundary between areas or regions. The boundary of a biological particle may refer to the outer edge, or the perimeter, as shown in an image of the particle taken from a given point of view. A boundary may also be used to describe the edge or periphery of a sub-region of a particle or element. The boundary of a cell may refer to the cell membrane, cell wall or cell capsule.

The term circumference of an element or region is to be understood as the distance around said element or region as represented in an image. In the case of the circumference of a boundary, this corresponds to the length of the boundary. The circumference of a biological particle is then the distance along the outer edge or the perimeter of the particle as shown from a given point of view.

DESCRIPTION OF THE INVENTION

Analysis of biological particles using cytometry, such as image cytometry, often relies on knowledge of masking, where masking is the method of determining region(s) of interest. Preferred implementations of the present invention include methods for masking of biological particle, such as to determine its boundary, and methods for masking elements or regions of biological particles.

In one embodiment of the invention, the method for the masking of at least one biological particle in a sample adhering to a surface of a sample compartment further comprises;
staining the surface of the sample compartment with dye,
placing the sample compartment in an image cytometer,
illuminating the sample compartment with light, where the illumination light generates fluorescent emission from the fluorescent dye,
recording images of fluorescent light from the sample and using images of fluorescent light signal to determine boundaries of biological particle.

These embodiments are of particular interest when the biological particle exhibits substantial contrast against the background under direct illumination conditions, while other embodiments of interest include dye that is fluorescent dye, thus allowing recording of image of fluorescent light information.

Preferred implementations of the present invention include methods for masking elements or regions of biological particles, where element or region of biological particle is the boundary of the particle or the cell membrane. Equally preferred are implementations where elements or regions of biological particle are contained within the boundary of the particle. Many tasks of image cytometry include analysis of the nucleus of biological particles and in such tasks it is preferred to include implementations of present invention where element or region of biological particle is the region of a particle that contains its nucleus. Other tasks of image cytometry include analysis of other parts of biological particles and in such implementations of the present invention, an element or region of biological particle is the cytoplasm, mitochondria, golgi apparatus, lysosome, endoplasmic reticulum, vacuole, chloroplasts, flagellum, nucleolus, stress granule, cytoskeleton, centrosome, cell wall, cell membrane, nuclear membrane, foci comprising biomolecules or in general any element or region of a biological particle.

Analysis of properties of biological particles and/or samples of biological particles preferably includes features of the present invention. Several of such analyses concern individual particles, such as analysis of status of cell cycle, cell viability or cell vitality, just to mention a few. In these cases it is of interest to locate one or more element or part of a cell, such as its nucleus, mitochondria, or other parts that are involved in cell metabolism.

Several image cytometry tasks including masking based on implementation of the present invention include estimate of size of a particle or a region of a particle, such as observed diameter and/or circumference of a particle or a region of a particle. Further such tasks often include preferred implementation of masking for the estimate of cell concentration in a sample of biological particles.

In image cytometry light information from a view of the sample is recorded for the purpose of analysis and preferably information from two or more views of different parts or volume of the same sample are recorded, thereby increasing the area and/or volume of the sample that is analysed. Several of the methods of masking according to the present invention can be used for the task of estimating number of particles in a view of the image cytometer, preferably where the number of particles present in two or more views are estimated. In several tasks of image cytometry the property of interest is the determination of intensity of light information, preferably fluorescent light information, from a particle and/or an element or a part of a particle where implementation of the present invention allow reliable masking of such particles and/or elements or regions of such particles.

It has been found that several embodiments of the present invention are suitable for analysis of biological particles such as yeast, fungi or bacteria cells and vertebrate cells, including mammalian, bird, reptile, amphibian, and fish cells. Depending on the nature of the sample and/or the purpose of the analysis, conditions of the cells can vary. Implementations of the present invention have been found to be useful for the analysis of biological particles adhering to a surface, such as samples where cells are growing on a substrate, such as a surface of a sample compartment. Such analysis are often of interest when the cells in question have tendency to form a colony on a substrate of some sort. In order to investigate such biological particles, implementations of the present invention allow samples containing adherent cells to be analysed directly, without first releasing such cells into solution, preferably by allowing the sample, containing the substrate to which the biological particle adhere, to be viewed in the image cytometer, using preferred embodiments of the present invention to mask out adherent biological particles and/or element or region of adherent biological particle.

In other embodiments of the present invention, cells in suspension are subjected to analysis. In such analysis of cells in suspension, especially when each view of the sample is investigated for a prolonged time, or in particular when it should be possible to revisit a given view of a sample it is preferred that the cells have sedimented prior to analysis, at least such that particles are in close proximity to a surface of the sample compartment prior to analysis. Time of such sedimentation process varies depending on the properties of the sample being analysed, properties such as viscosity, particle size and density are of greatest importance, but also on the properties of the sample compartment used.

In several of the embodiments of the present invention masking is achieved by using dye for the staining of biological particles and/or parts of biological particles. In many preferred embodiments such dye is a fluorescent dye such as organic dye, inorganic dyes, polymer dye or biological fluorophore. In several tasks of image cytometry, analysis of elements or parts of biological particle containing DNA, RNA lipids, proteins, carbohydrates are of interest. Methods of the present invention implemented in such tasks preferably include fluorescent dye(s) that binds to nuclei of a cell, preferably where fluorescent dye(s) binds to DNA and in other methods where fluorescent dye(s) binds to RNA. Similarly in several embodiments of the present invention fluorescent dye(s) binds to both DNA and RNA of a biological particle. In these embodiments of the present invention dyes selected from the following group of fluorescent dyes are often preferred; DAPI (4',6-diamidino-2-phenylindole, CAS Number: 28718-90-3), Hoechst 33342, Hoechst 3325, Hoechst 34580, PI (Propidium Iodide, 3,8-Diamino-5-[3-(diethylmethylammonio)propyl]-6-phenylphenanthridinium diiodide, CAS Number 25535-16-4), RedDot™ 1, RedDot™ 2, DRAQ7™ (Deep Red Anthraquinone 7), DRAQ5™ (Deep Red Anthraquinone 5).

Proteins are integral part of biological particles and it has been found that several embodiments of the present invention enable the use of proteins for the purpose of analysing biological particles or part of particles by masking particles or parts of particles, preferably where the proteins are stained with one or more dyes, such as dyes causing attenuation of light and/or giving rise to fluorescence.

The boundaries of a cell, usually defined by its membrane are an important element of cell analysis in image cytometry. Cells in suspension often have regular spherical boundary, relatively homogenous in size. The representation of such a cell in image cytometry is a disk and the task of determining its circumference is a typical task in image cytometry. The spherical form of a cell often makes it preferable to use embodiments of the present invention including visible light techniques, such as Bright Field, Dark Field or Phase Contrast to mask a cell based on scattering and/or difference in refractive index. Other embodiments include method of staining cell membrane and/or its cytoplasm or protoplasm, preferably by staining the cells with dyes that cause attenuation of light and/or giving rise to fluorescence. In one embodiment of the invention, a reactive group such as azide, maleimide or succinimidyl ester is conjugated to one or several of the following fluorescence molecules, CF™ dye family, Alexa™ fluorophore dye family, DyLight® dye family, BrilliantViolet dye family, fluorescent proteins, Quantum Dots, Lanthanides. In preferred embodiment a fluorescent dye is preferably a dye such as Vitabright-43, VitaBright-48™, HCS CellMask™ Blue, HCS CellMask™ Green, HCS CellMask™ orange, HCS CellMask™ Red, HCS CellMask™ Deep red.

In some embodiments of the present invention, the one or more images of the fluorescent light from the sample are used to determine the circumference of the biological particle or an element or region of the biological particle or the circumference of a boundary in the biological particle. The circumference may be determined for particles with regular shapes, such as spherical or ellipsoidal, as well as irregularly shaped particles.

In other embodiments a peptide such as an antibody or a reactive group such as azide, maleimide, succinimidyl ester, carbodiimide, carbonyl, diazirine, hydrazide, hydroxymethyl phosphine, imidoester, isocyanate, PFP-ester, psoralen, pyridyl disulfide, vinyl sulfone, methanethiosulfonate is conjugated to one or several of the following fluorescence molecules, CF dye family, Alexa™ fluorophore dye family, DyLight® dye family, BrilliantViolet dye family, fluorescent proteins, Quantum Dots, Lanthanides, thus staining a biological particle or an element of a biological particle.

Many preferred embodiments of the present invention use two or more dyes for the staining of biological particles and/or elements or regions of biological particles and this is often of interest in image cytometry when the task is to mask two or more features of a cell for analysis, such as its boundary and one or more elements or region of the cell, or when masking two or more elements or regions of a cell. Such methods of the present invention are often preferred when the biological particle is a cell that adheres to a surface, such as a surface of a sample compartment, since under these conditions visible light techniques are often of limited use due to low contrast. Further, the boundaries of adherent cells are often very irregular in shape and size, and they are in close proximity or even adjacent to other adherent cells. Under these conditions several embodiments of the present invention have been found to offer great advantage compared to the methods of prior art when applied in image cytometry.

It has been found in embodiments of the present invention when two or more fluorescent dyes are used to stain biological particles and/or elements or region of biological particles, to use a preferred selection of dyes, such selections being one the following, a mixture of Maleimide-CF™ 405S and DAPI or Hoechst, a mixture of Maleimide-CF™ 647 and RedDot™ 2 or DRAQ7™.

Several preferred embodiments of the present invention include methods of masking where a fluorescent dye has different emission intensity depending on the conditions of the fluorescent dye. Preferably such fluorescent dye can have different states, such as state where fluorescence emission is limited, preferably substantially non-existing, and another state where emission is intense under otherwise substantially identical conditions. Such embodiments have been found to offer advantages over methods of prior art, such as the possibility to conduct image cytometry analysis without interference from fluorescence emission from such masking dye, since overlap in emitted fluorescence light can influence sensitivity and/or flexibility of the analysis. In embodiments of the present invention a caged fluorescent dye is used, such as a photoactivatable caged dye, such as a dye which shows very low fluorescence efficiency until it has been illuminated by light of certain wavelength, such as illuminated by light of short wavelength such as ultraviolet (UV) light.

In one embodiment of the present invention, one of the fluorescent dyes is a caged fluorescent dye, preferably where the caged fluorescent dye is a photoactivatable dye. One preferred embodiment includes two fluorescent dyes for masking where at least one of them is a caged fluorescent dye, such as a mixture of Maleimide-635-CAGED and RedDot™ 2 or DRAQ7™.

In several embodiments of the present invention it has been found that fluorescent dyes offer substantial advantage in the task of masking, such as when the task masking is to identify small elements or regions of a cell, where staining often can be used to differentiate on the bases of the specific ability of a fluorescent dye to stain element or region of a cell while others elements or regions of a cell are substantially not stained by the fluorescent dye. Further methods of the present invention make it possible to mask biological particles, elements or regions of biological particles, in situation where concentration of chemical constituents is very low preferably where it is so low that other optical imaging techniques fail to produce detectible change in light intensity. In other embodiments, in particular when it is advantageous to perform masking without the use of a dye, or when it is advantageous to use non-fluorescent dye, it is preferred to use optical properties such as light scattering or light attenuation to obtain light intensity information that is used in the task of masking or determining boundaries of biological particle, element or region of biological particle.

Several preferred embodiments of the present invention use methods of light scatter, such as bright field and/or dark field methods, in the task of masking, preferably when the property of the sample is such that it is possible to generate adequate contrast in the image of light intensity information, while other embodiments use the methods of phase contrast and/or light attenuation for the task. The advantage of using such methods is often that the chemical treatment of the sample, including staining, is more simple and/or the optical arrangement of the image cytometer can be more simple, often by reducing the need for optical filters. Several preferred embodiments use a combination of fluorescence light intensity information and scatter and/or phase contrast and/or attenuation of light for the task of masking biological particles, elements or regions of biological particles.

Many highly preferred embodiments of the present invention use as a light source Light Emitting Diode (LED). In several of these embodiments two or more Light Emitting Diodes (LEDs) are preferred, which often offers advantages such as the ability to increase intensity of illuminated light by using two or more LEDs emitting light in substantially the same wavelength band and/or the ability to illuminate the sample with light of two or substantially different wavelength bands by using two or more LEDs emitting light in substantially different wavelength band.

When implementing embodiments of the present inventions in image cytometry it is often preferred to have high optical magnification, namely since such conditions favour large imaging of small details but also allow the use of large numerical aperture of the optical system, thus facilitating collection of large amount of light. On the other hand high optical magnification inherently limits the field of view of the image cytometer, thus limiting the volume or area of the sample that is recorded in a single view. Therefore several preferred embodiments of the present invention include implementation of moderate optical magnification such as optical magnification below ×100 and in some situation optical magnification below ×60, typically when detailed information concerning size and/or morphology of biological particles and/or elements or parts of biological particles is of interest. Further in other embodiments optical magnification such as optical magnification of ×20 below is of interest, typically when objects under analysis are sufficiency large to allow detailed image representation and/or when it is of interest to image large portion of the sample in each sub-sample image, such as when it is of interest to limit the number of sub-sample images of different sections of the sample while still analysing the entire sample or at least a substantial fraction of the sample.

Since low optical magnification reduces the ability to resolve small features in the image of a biological particle in several preferred embodiments of the present invention it is preferred that optical magnification is in the range between ×100 and ×2, such as in the range between ×20 and ×4. In yet other embodiments, typically where small features of biological particles are of less interest it is preferred that optical magnification is ×10 or less, preferably where optical magnification is ×5 or less. In particular when it is of interest that large volume and/or large area of the sample are represented in the field of view of the image cytometer several embodiments of the present invention include implementations where optical magnification is ×4 or less, in several embodiments a very low optical magnification is preferred such as optical magnification of ×2 or less.

In embodiments of the present invention masking a biological particle or elements or regions of biological particle is achieved in a single image of the image cytometer. In other embodiments of the present invention two or more images of the same view of the sample are used for the task, preferably where at least one of these images is an image of fluorescence light intensity. In several such embodiments where two or more images are used, preferably at least one of these images is an image of bright field, dark field, phase contrast or attenuated light signal.

In embodiments of the present invention a dye is used to stain a wall of the sample compartment, preferably where a wall of the sample compartment is stained with fluorescent dye. This implementation is particularly of interest when it becomes possible to mask biological particle that adheres to a wall, preferably where the region of the wall where the biological particle is in direct contact is not stained, such as when the staining is performed after the particle settles on or adheres to a wall, or when the staining is performed before the particle settles on or adheres to a wall but prior to analysis those parts of the wall where particle is not in direct contact with the particle can be stripped of dye, thus reducing or eliminating fluorescent signal from a wall in regions where a particle is not adhering.

Segmentation was performed in XcytoView™ and based on the two images to the left in each row. All pictures in the figure were acquired with 20× magnification.

Figure 7:
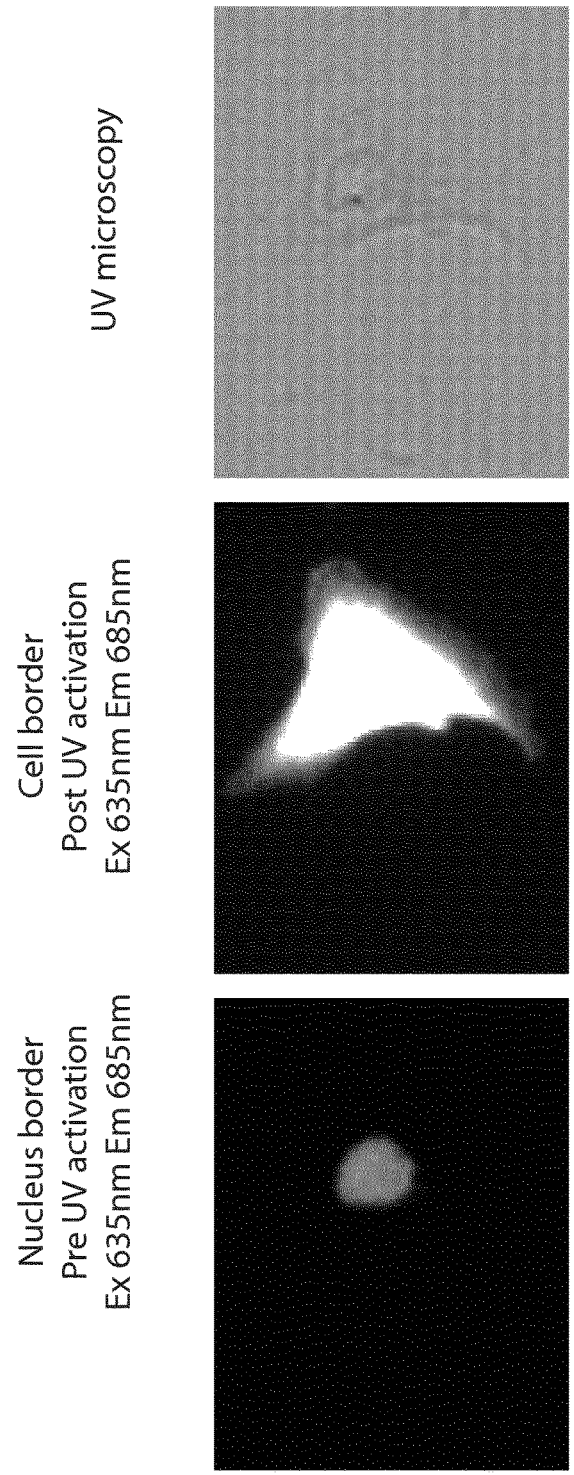

FIG. 7 illustrates UV activated cytoplasmic staining of U2OS cells. The U2OS cells were gown on a glass surface, fixed with NBF, permeabilized and counterstained with Maleimide-Abberior-CAGE-635 and RedDot™ 2 for 30 minutes at room temperature. The same channel is shown before and after UV activation of Maleimide-Abberior-CAGE-635. All pictures in the figure were acquired with 20× magnification.

EXAMPLE 1

Single-Excitation Single-Emission Fluorescence Masking of U2OS Cells

Cells were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). $3.75*10^5$ cells were seeded in Ibidi 12-well slides (81201, Ibidi) or 8-well Millicell EZ slides (PEZGS0816, Merck Millipore) and incubated overnight. The next day the adherent cells were washed in PBS and fixed in 10% neutral buffered formalin (NBF) for 15 minutes at room temperature and permeabilized in 0.1% Triton X-100 in PBS for 10 minutes at room temperature. Subsequently the cells were washed in PBS and counterstained with the following dye combinations: 0.2 μM VitaBright-48™ (Solution 20, ChemoMetec A/S, Denmark, P/N 910-3020) and 1 μg/ml DAPI (Solution 12, ChemoMetec A/S, Denmark, P/N 910-3012); 0.2 μM VitaBright-48™ and 2 μg/ml Hoechst 33342 (Solution 15, ChemoMetec A/S, Denmark, P/N 910-3015) or 10 μg/ml Hoechst 33342; 0.05 μM Maleimide-CF™ 405S (P/N 92030, Biotium Inc., USA) and 1 μg/ml DAPI; 1 μM Succinimidyl Ester-CF™ 405S (P/N 92110, Biotium Inc., USA) and 2 μg/ml DAPI; 5 μM AMCA-X-SE (P/N 90077, Biotium Inc., USA) and 2 μg/ml DAPI; 1 μM Maleimide-CF™ 647 (P/N 92027, Biotium Inc., USA) and 1% RedDot™ 2 (P/N 40061, Biotium Inc., USA). All stainings were performed in PBS for 30 minutes at room temperature, except for VitaBright stainings that were incubated for 5 minutes at 37° C. After staining the cells were washed for 5 minutes in PBS, and mounted with Vectashield mounting medium (H-1400, VECTOR LABORATORIES) or with EverBrite Mounting Medium (P/N 23001, Biotium Inc., USA). Images was acquired with Xcyto®10 image cytometer (ChemoMetec A/S, Denmark) with 20× magnification using the UV bright field channel and the following combinations of LED light sources and emission filters; 405 nm LED with 452 nm (band pass: 430-475 nm) emission filter and 635 nm LED with 685 nm (band pass: 665-705 nm) emission filter. Image scaling and pseudo-colors was adjusted in XcytoView™ (ChemoMetec A/S, Denmark). Image analysis was performed in Cell Profiler software (http://cellprofiler.org/).

Figure 1:
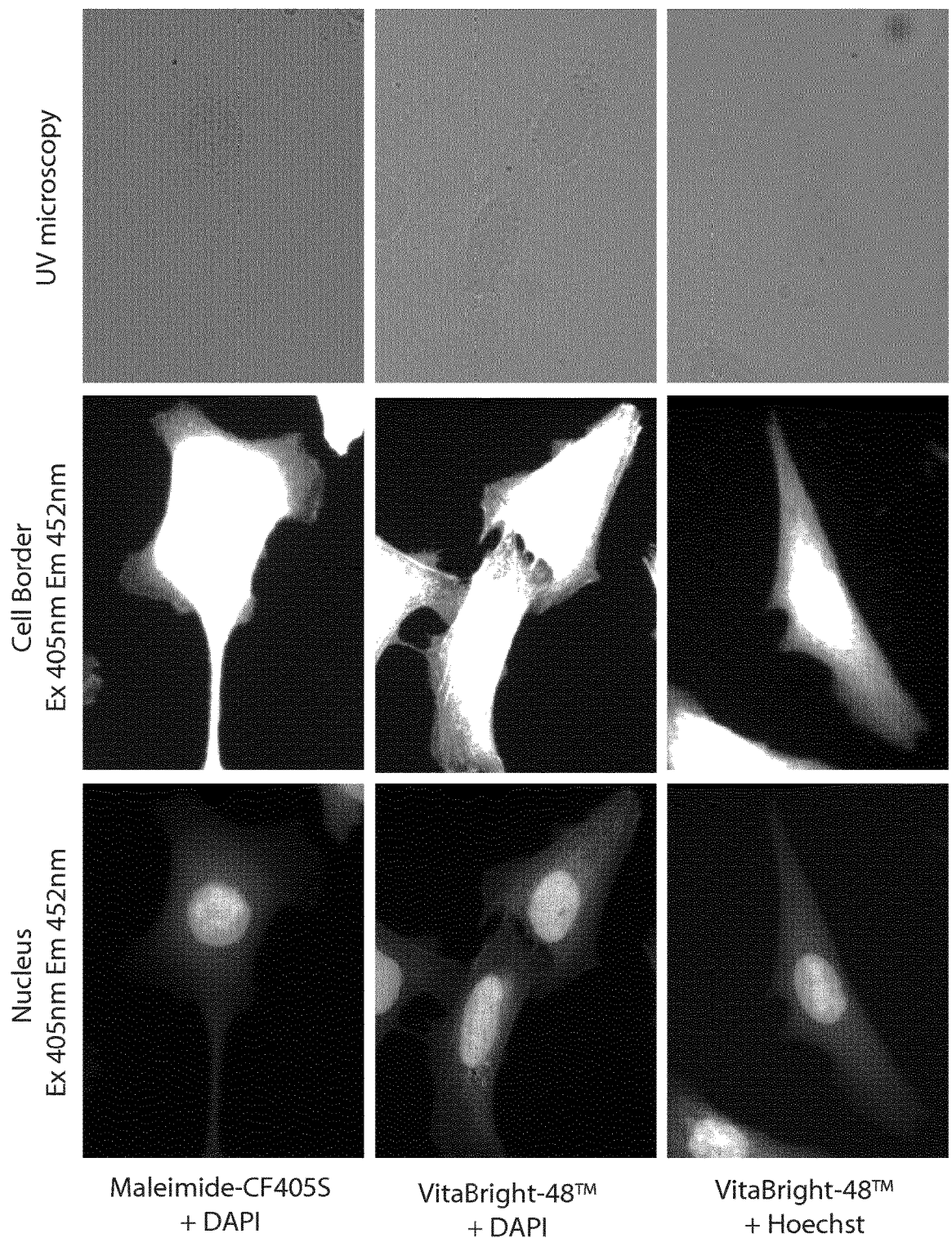
FIG. 1A illustrates co-staining of U2OS cells with a DNA dye and a cytoplasm dye. U2OS cells were gown on a glass surface, fixed with NBF, permeabilized and stained with the following dye combinations: VB48 and DAPI or Hoechst; Maleimide-CF™405S and DAPI; succinimidyl ester-CF™405S and DAPI; AMCA-X-succinimidyl ester and DAPI; Maleimide-CF™647 and RedDot™2. All pictures in the figure were acquired with 20× magnification.
FIG. 1B shows a U2OS cell stained with VB48 and 10 μg/ml Hoechst. Segmentation was performed in Cellprofiler and based on one image. 101 marks the boundary of the cell (white) and 102 marks the boundary of the nuclei (black). All pictures in the figure were acquired with 20× magnification.
Figure 1:
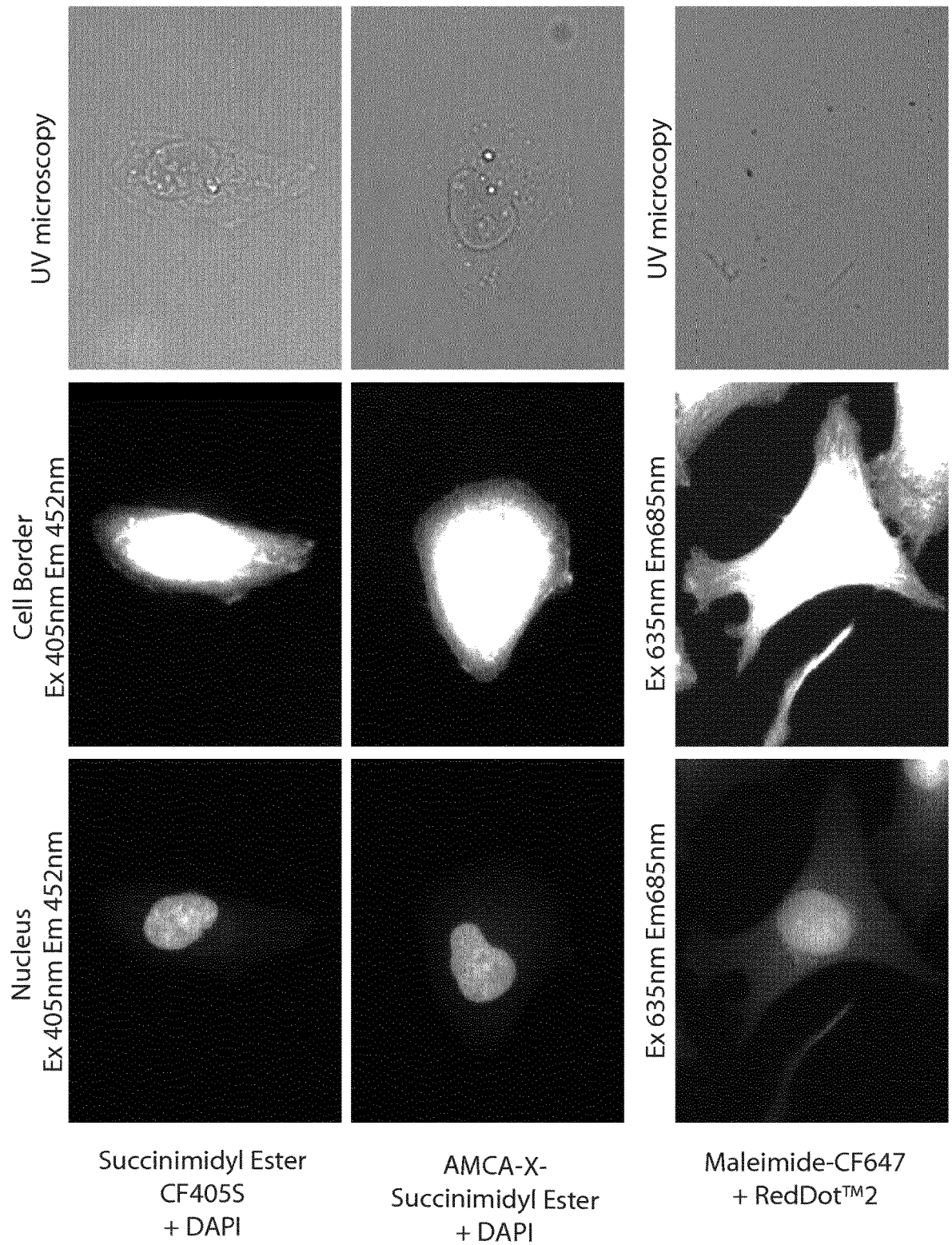
Figure 1:
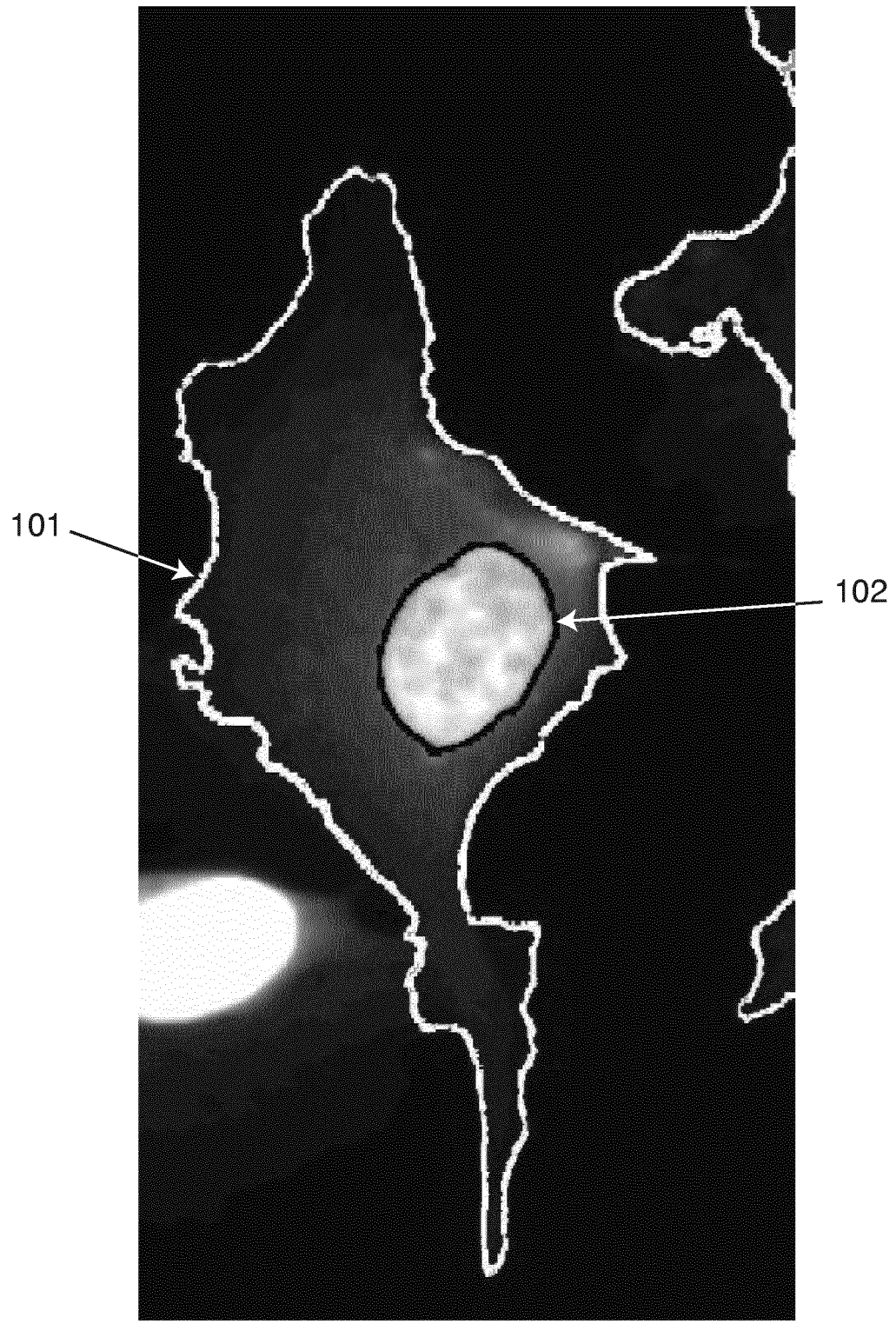

The nucleus and the cytoplasm were stained with an array of spectrally overlapping dyes, where one dye stains the nucleus and one dye stains the cytoplasm. Based on the difference in staining intensities the cytoplasm and nucleus could readily be identified, see FIG. 1A and FIG. 1B. Thus, based on the method Single-EX Single-EM fluorescence one image was collected with all the information needed for cell segmentation. This is advantageously as it maximizes the amount of free channels available for user-defined markers.

EXAMPLE 2

Single-Excitation Fluorescence Masking of U2OS Cells

Cells were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). $3.75*10^5$ cells were seeded in Ibidi 12-well slides (81201, Ibidi) or 8-well Millicell EZ slides (PEZGS0816, Merck Millipore) and incubated overnight. The next day the adherent cells were washed in PBS and fixed in 10% neutral buffered formalin (NBF) for 15 minutes at room temperature and permeabilized in 0.1% Triton X-100 in PBS for 10 minutes at room temperature. Subsequently the cells were washed in PBS and counterstained with the following dye combinations: 0.2 µM VitaBright-48™ (Solution 20, ChemoMetec A/S, Denmark, P/N 910-3020) and 1 µg/ml DAPI (Solution 12, ChemoMetec A/S, Denmark, P/N 910-3012); 0.2 µM VitaBright-48™ and 2 µg/ml Hoechst 33342 (Solution 15, ChemoMetec A/S, Denmark, P/N 910-3015) or 10 µg/ml Hoechst 33342; 0.05 µM Maleimide-CF™405S (P/N 92030, Biotium Inc., USA) and 1 µg/ml DAPI; 1 µM Succinimidyl Ester-CF™405S (P/N 92110, Biotium Inc., USA) and 2 µg/ml DAPI; 504 AMCA-X-SE (P/N 90077, Biotium Inc., USA) and 2 µg/ml DAPI; 1 µM Maleimide-CF™647 (P/N 92027, Biotium Inc., USA) and 1% Red-Dot™2 (P/N 40061, Biotium Inc., USA). All stainings were performed in PBS for 30 minutes at room temperature, except for VitaBright stainings that were incubated for 5 minutes at 37° C. After staining the cells were washed for 5 minutes in PBS, and mounted with Vectashield mounting medium (H-1400, VECTOR LABORATORIES) or with EverBrite Mounting Medium (P/N 23001, Biotium Inc., USA). Images was acquired with Xcyto®10 image cytometer (ChemoMetec A/S, Denmark) with 20× magnification using the UV bright field channel and the following combinations of LED light sources and emission filters; 405 nm LED with 452 nm (band pass: 430-475 nm) emission filter and 635 nm LED with 685 nm (band pass: 665-705 nm) emission filter. Image scaling and pseudo-colors was adjusted in XcytoView™ (ChemoMetec A/S, Denmark). Image analysis was performed in Cell Profiler software.

Figure 2:
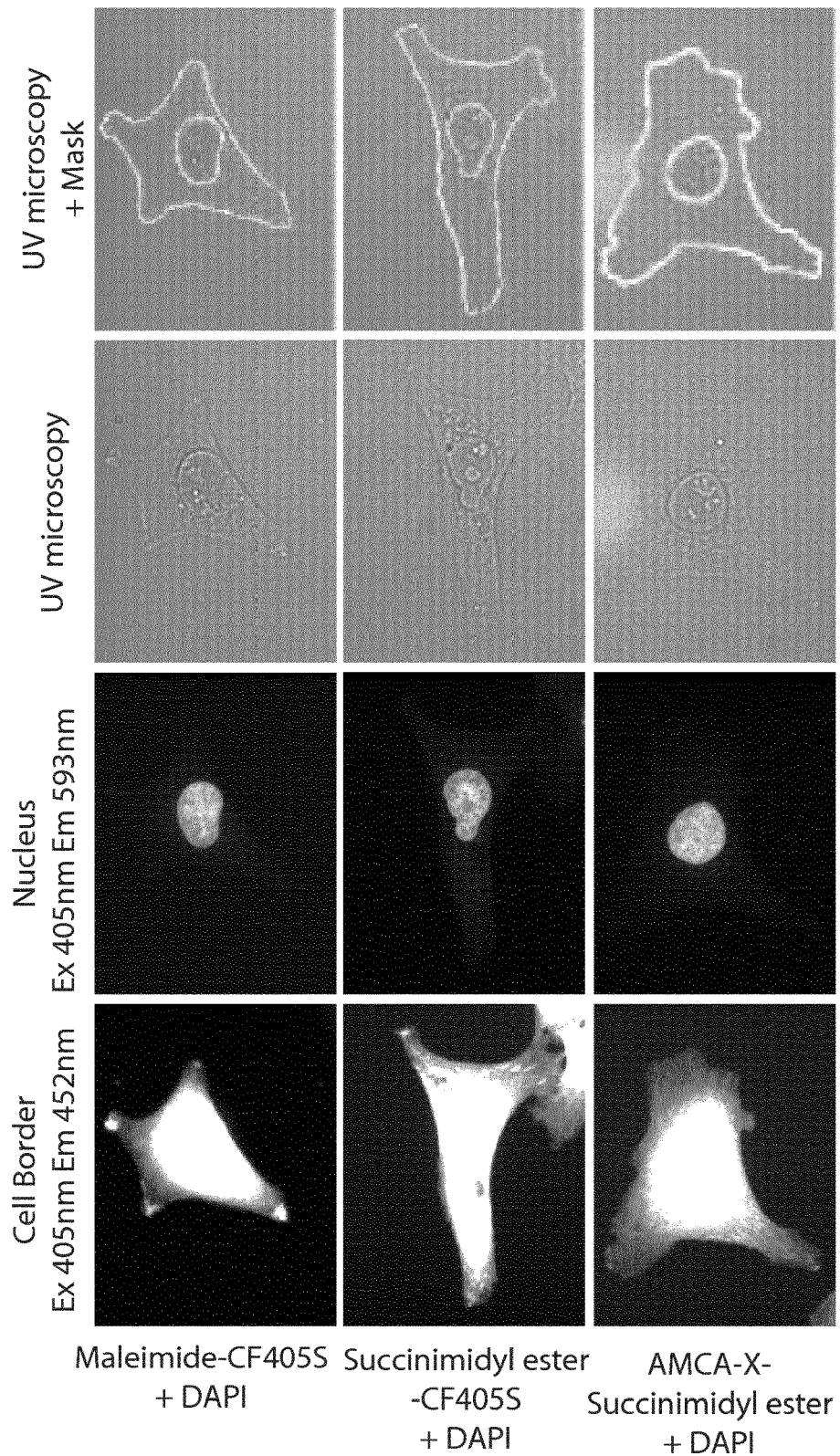
FIG. 2 illustrates co-staining of U2OS cells with a DNA dye and one or two cytoplasm dye(s). U2OS cells were gown on a glass surface, fixed with NBF, permeabilized and stained for 30 minutes with the dye combinations indicated on the left panel of the figure. Segmentation was performed in XcytoView™ and based on the two fluorescent images. All pictures in the figure were acquired with 20× magnification.
Figure 2:
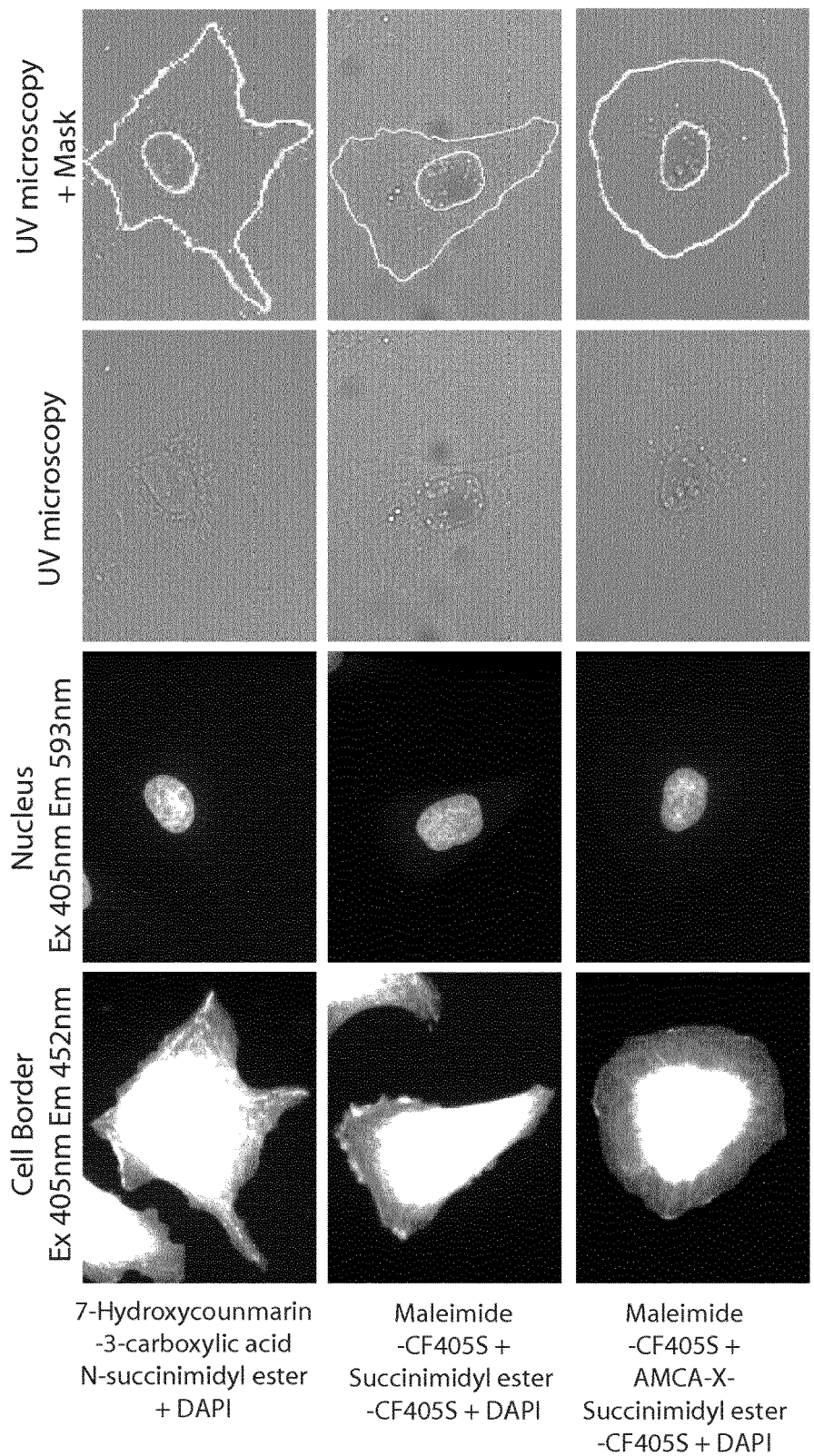
Figure 2:
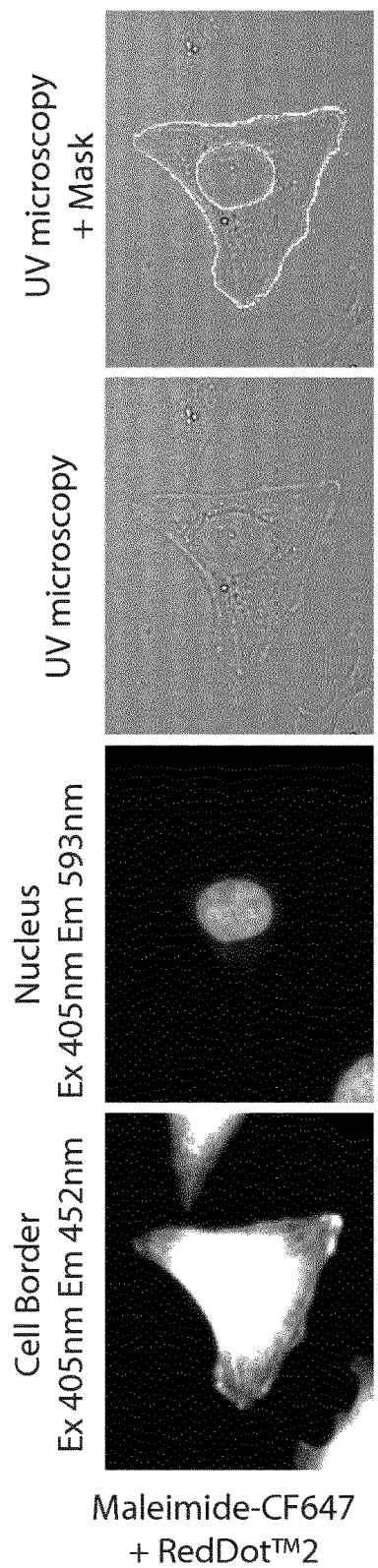

The nucleus and the cytoplasm were stained with an array of spectrally overlapping dyes, where one dye stains the nucleus and one or more dye(s) stains the cytoplasm. Based on the different emission spectra of the dyes the cytoplasm and nucleus could readily be identified, see FIG. 2. Thus, based on the method Single-EX fluorescence two images were collected with all the information needed for cell segmentation. This is advantageously since only one excitation light source was used and thus maximizes the amount of free channels available for user-defined markers.

EXAMPLE 3

Single-Excitation Fluorescence Masking of Immunofluorescent Stained Cells

MCF7, U205, MDA-MB-231 and HeLa cells were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). $3.75*10^5$ cells were seeded in 4- or 8-well Millicell EZ slides (PEZGS0416, PEZGS0816, Merck Millipore) and incubated overnight. The next day the adherent cells were washed in PBS and fixed in ice-cold MeOH for 10 minutes at −20° C. or 10% neutral buffered formalin (NBF) for 15 minutes at room temperature and permeabilized in 0.1% Triton X-100 in PBS for 10 minutes at room temperature. Cells were washed in PBS and blocked with 1% bovine serum albumin (BSA) in PBS supplemented with 0.05% Tween 20 (PBS-T) for 30 minutes. Primary antibody α-NF-κB (SC-372, Santa Cruz) was applied 1:100 in 1% BSA in PBS-T and incubated for 1 hour at room temperature. Secondary antibody α-Rabbit-CF488A (P/N 20015, Biotium Inc., USA) was applied 1:400 in 1% BSA in PBS and incubated for 45 minutes at room temperature. Subsequently the cells were washed in PBS and counterstained with the following dye combinations: 0.05 µM Maleimide-CF™ 405S (P/N 92030, Biotium Inc., USA) and 2 µg/ml DAPI (Solution 12, ChemoMetec A/S, Denmark, P/N 910-3012); 0.025 µM Maleimide-CF™ 405S (P/N 92030, Biotium Inc., USA), 0.25 µM Succinimidyl Ester-CF™ 405S (P/N 92110, Biotium Inc., USA) and 2 µg/ml DAPI. All stainings were performed in PBS for 30 minutes at room temperature. After staining the cells were washed for 5 minutes in PBS, and mounted with Vectashield mounting medium (H-1400, VECTOR LABORATORIES). Images was acquired with Xcyto®10 image cytometer (ChemoMetec A/S, Denmark) with 20× magnification using the UV bright field channel and the following combinations of LED light sources and emission filters; 405 nm LED with 452 nm (band pass: 430-475 nm) emission filter, 405 nm LED with 593 nm (band pass: 573-613 nm) emission filter and 488 nm LED with 534 nm (band pass: 513-555 nm) emission filter. Image analysis, scaling and pseudo-colors was performed and adjusted in XcytoView™ (ChemoMetec A/S, Denmark).

Figure 3:
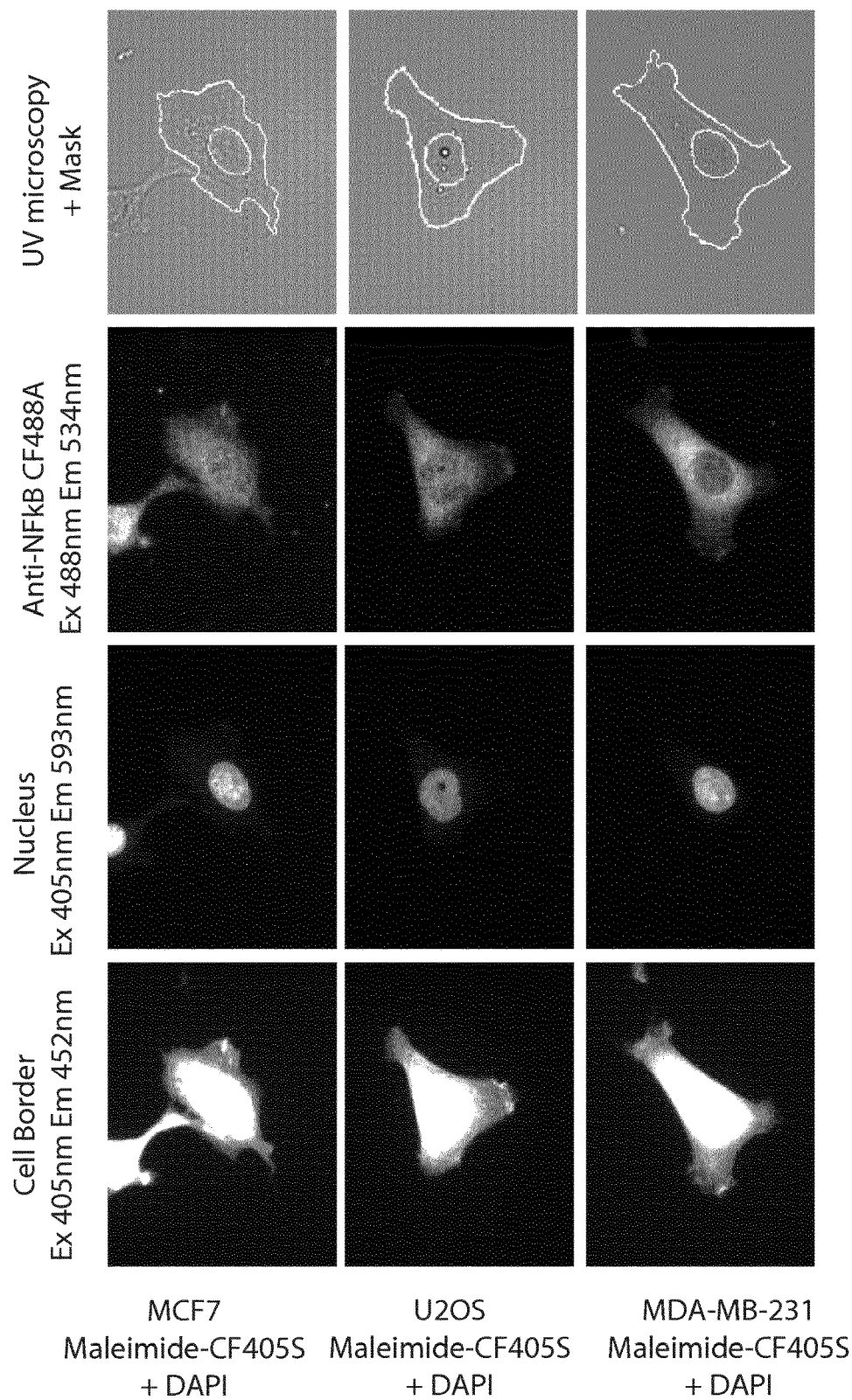
FIG. 3 illustrates immunofluorescent stained MCF7, U2OS, MDA-MB-231 and HeLa cells. The cells were grown on a glass surface, NBF fixed permeabilized and immunofluorescent stained against NF-κB. Subsequently the cells were counterstained with the following combinations of a DNA dye and one or two cytoplasm dye(s): Maleimide-CF™ 405S and DAPI; Maleimide-CF™ 405S, succinimidyl ester-CF™ 405S and DAPI. Segmentation was performed in XcytoView™ and based on the two images to the left in each row. All pictures in the figure were acquired with 20× magnification.
Figure 3:
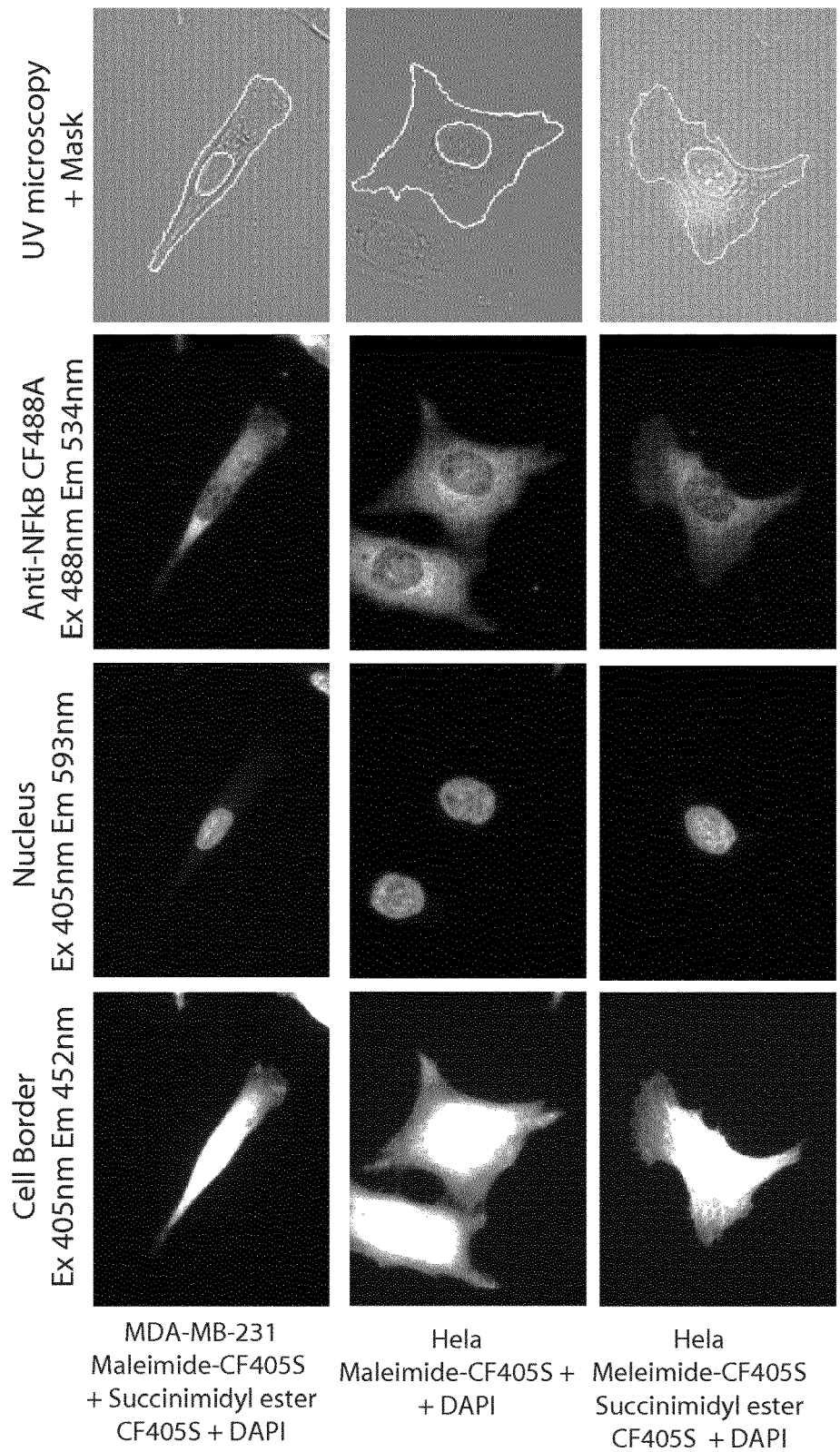
Figure 4:
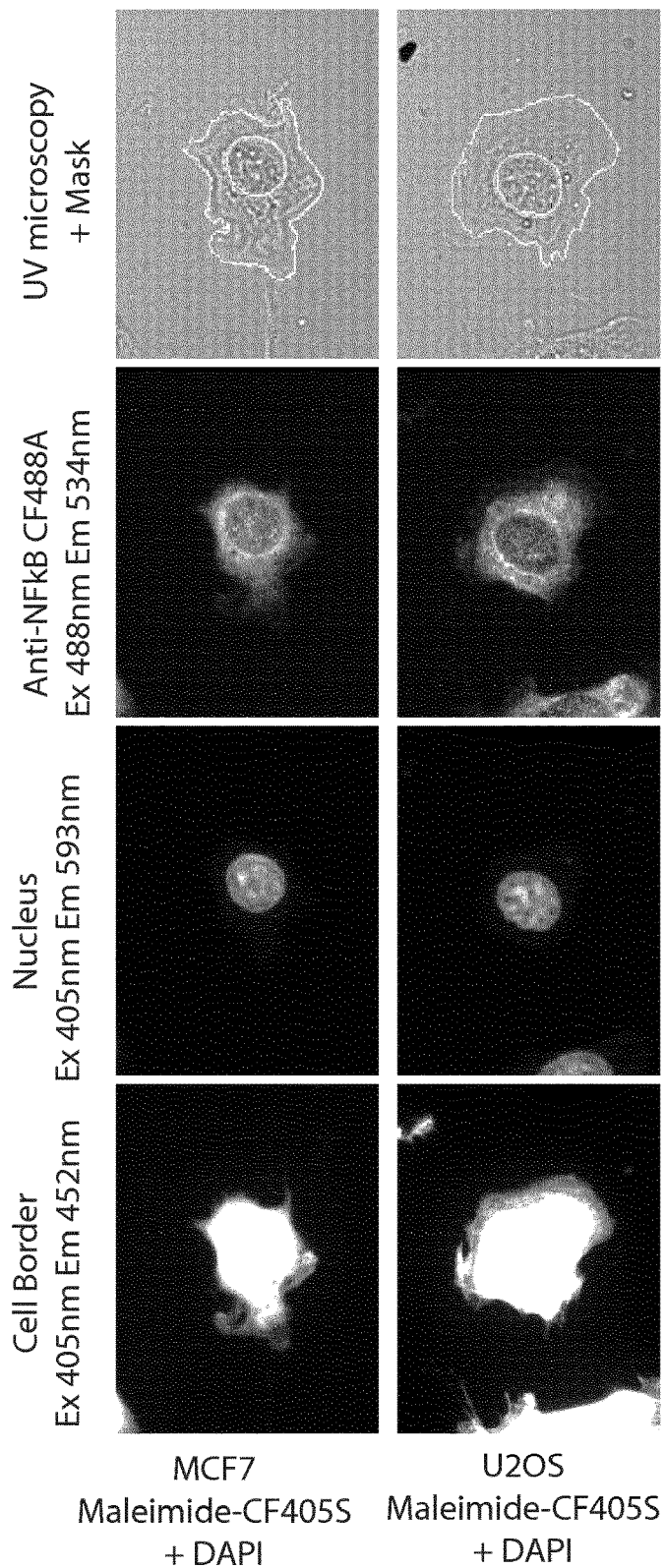
FIG. 4 illustrates immunofluorescent stained MCF7 and U2OS cells. The cells were grown on a glass surface, MeOH fixed and immunofluorescent stained against NF-κB. Subsequently the cells were counterstained with Maleimide-CF™ 405S and DAPI for 30 min at room temperature. Segmentation was performed in XcytoView™ and based on the two images to the left in each row. All pictures in the figure were acquired with 20× magnification.

The Single-EX fluorescence masking method was applied to immunofluorescent stain cells against NF-κB. The nucleus and the cytoplasm were stained with spectrally overlapping dyes, where one dye stains the nucleus and one or more dye(s) stains the cytoplasm. Based on the different emission spectra of the dyes the cytoplasm and nucleus could readily be identified, see FIGS. 3 and 4. The method worked on an array of different cell lines, MCF7, U205, MDA-MB-231 and HeLa, see FIG. 3. Furthermore, the Single-EX fluorescence masking performed well both for NBF fixed cells and MeOH fixed cells, see FIG. 3 and FIG. 4. Thus the method Single-EX fluorescence performs well across different cell lines, fixation methods and is compatible with immunofluorescent staining.

EXAMPLE 4

Single-Excitation Fluorescence Masking of Fluorescence In Situ Hybridization Stained Cells U2OS cells were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). $3.75*10^5$ cells were seeded in Ibidi 12-well slides (81201, Ibidi) and incubated overnight. The next day the cells were fixed and stained according to the RNAscope® protocol (ADVANCED CELL DIAGNOSTICS, INC.) using a probe against human PCNA (553071, ADVANCED CELL DIAGNOSTICS, INC.) and detected with Amp 4 Alt B-FL (320856, ADVANCED CELL DIAGNOSTICS, INC.). Cells were subsequently washed in PBS and counterstained with 2 µg/ml DAPI in combination with the following dyes: 0.5 µM Maleimide-CF™ 405S (P/N 92030, Biotium Inc., USA); 5 µM Succinimidyl Ester-CF™ 405S (P/N 92110, Biotium Inc., USA); 0.5 µM 7-Hydroxycoumarin-3-carboxylic acid N-succinimidyl ester (P/N 55156, Sigma-Aldrich); 25 µM AMCA-X-Succinimidyl Ester (P/N 90077, Biotium Inc., USA); 0.5 µM Maleimide-CF™ 405S (P/N 92030, Biotium Inc., USA) and 5 µM Succinimidyl Ester-CF™ 405S (P/N 92110, Biotium Inc., USA). All stainings were performed in PBS for 30 minutes at room temperature. After staining the cells were washed for 5 minutes in PBS, and mounted with Vectashield mounting medium (H-1400, VECTOR LABORATORIES). Images was acquired with Xcyto@10 image cytometer (ChemoMetec A/S, Denmark) with 20× magnification using the UV bright field channel and the following combinations of LED light sources and emission filters; 405 nm LED with 452 nm (band pass: 430-475 nm) emission filter, 405 nm LED with 593 nm (band pass: 573-613 nm) emission filter and 535 nm LED with 609 nm (band pass: 582-636 nm) emission filter. Image analysis, scaling and pseudo-colors was performed and adjusted in XcytoView™ (ChemoMetec A/S, Denmark).

Figure 5:
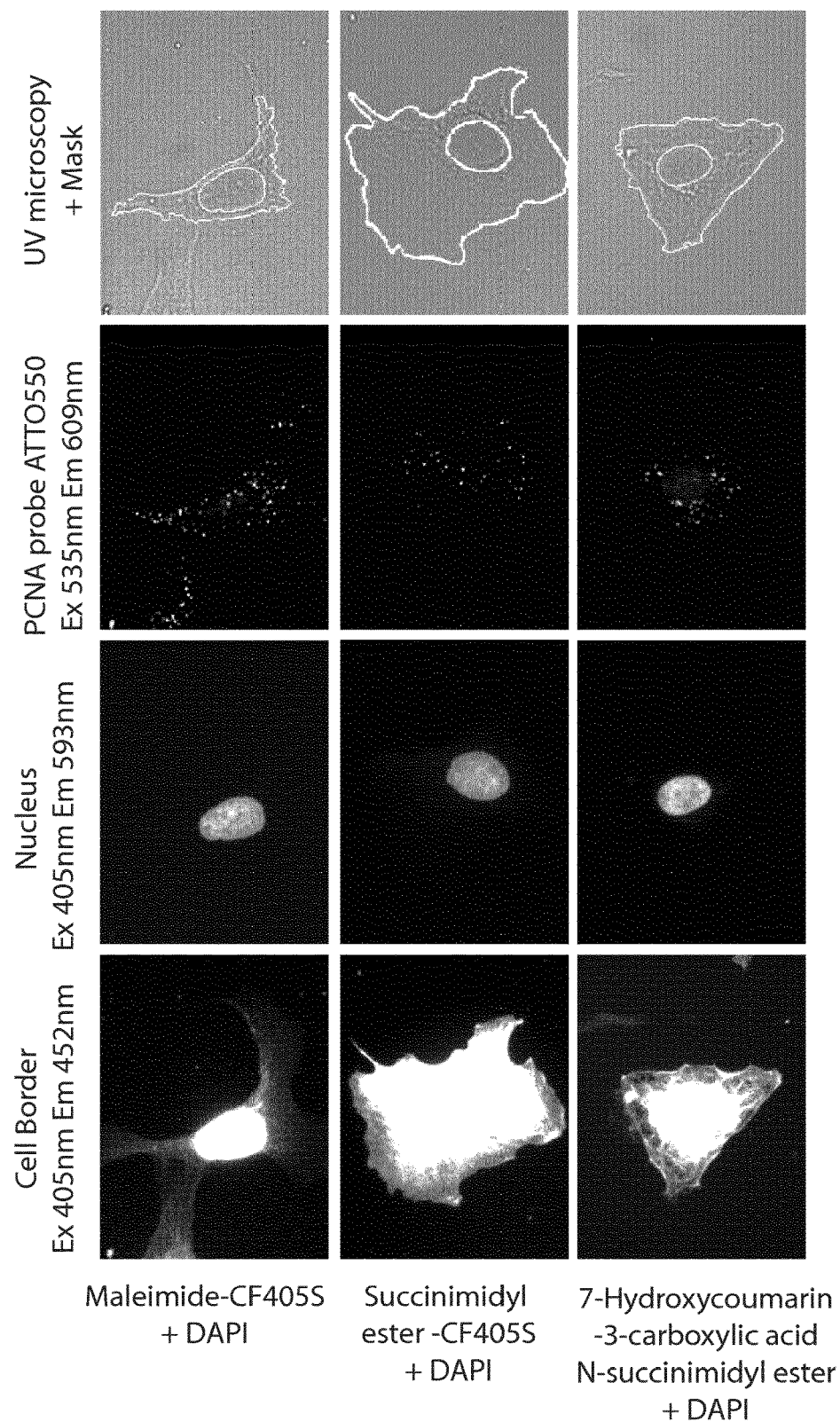
FIG. 5 illustrates fluorescence in situ hybridization stained U2OS cells. The cells were gown on a glass surface, NBF fixed and stained against human PCNA mRNA using RNAscope®. Subsequently the cells were counterstained by combining a DNA dye with one or two cytoplasm dye(s) as specified on the left panel of the figure. Segmentation was performed in XcytoView™ and based on the two images to the left in each row. All pictures in the figure were acquired with 20× magnification.
Figure 5:
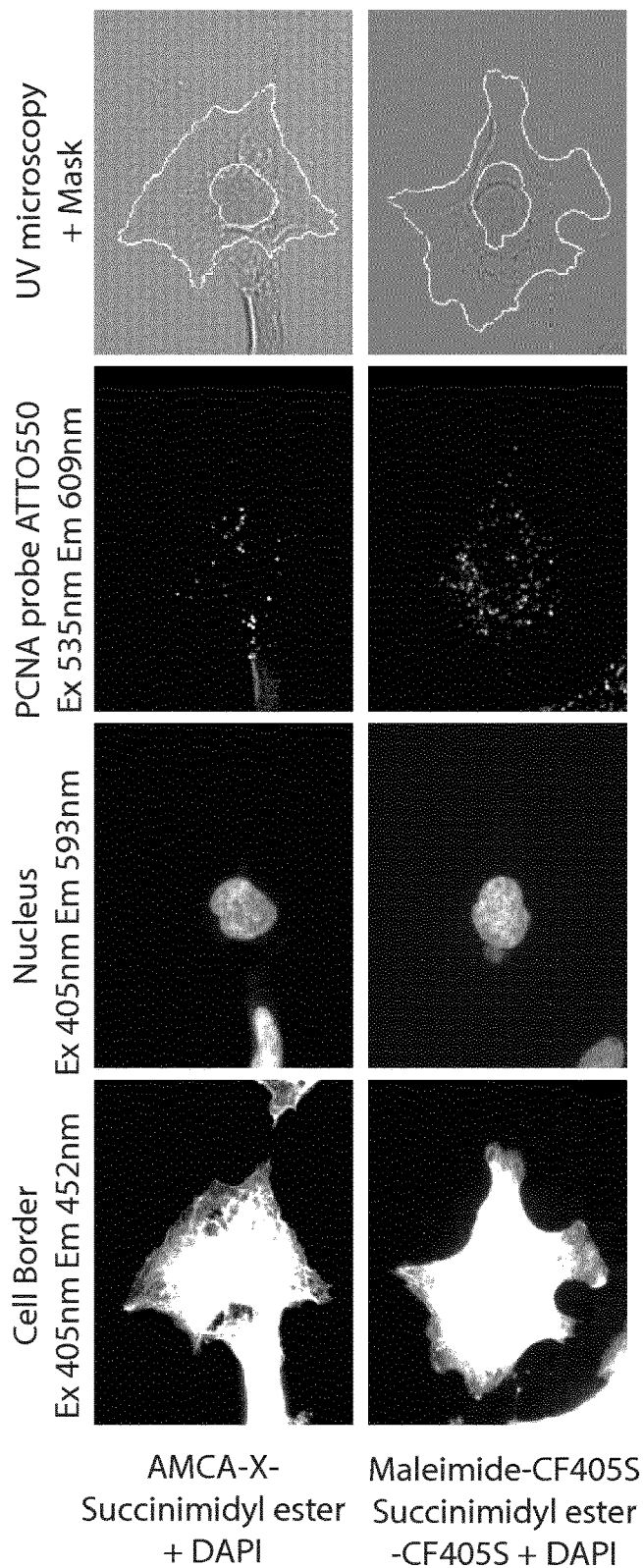

The Single-EX fluorescence masking method was applied to Fluorescence in situ hybridization (FISH) stained U2OS cells. The nucleus and the cytoplasm were stained with spectrally overlapping dyes, where one dye stains the nucleus and one or more dye(s) stains the cytoplasm. Based on the different emission spectra of the dyes the cytoplasm and nucleus could readily be identified with the exception of Maleimide-CF™ 405S, see FIG. 5. The reduction in cytoplasmic staining when using Maleimide-CF™ 405S could be compensated by mixing Maleimide-CF™ 405S with another reactive group conjugated to the same or a similar fluorophore. An example is the combination of Maleimide-CF™ 405S and Succinimidyl Ester-CF™ 405S. This mixture is advantageous as it makes the staining more robust due to the different reactive groups targeting different cellular components, see FIG. 5 lower panel. The Single-EX fluorescence masking method is compatible with FISH staining.

EXAMPLE 5

Single-Excitation Fluorescence Masking of Live HeLa Cells

HeLa cells stably co-expressing Lyso-GFP and Mito-dsRED were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). 3.75*$10^5$ cells were seeded in 8-well Millicell EZ slides (PEZGS0816, Merck Millipore) and incubated overnight. The next day the cells were counterstained with 10 µg/ml Hoechst (Solution 15, ChemoMetec A/S, Denmark, P/N 910-3015) in growth media for 15 minutes at 37° C. Cells were washed in PBS and counterstained with 10 µg/ml Hoechst in combination with either 50 µM 7-Hydroxycoumarin-3-carboxylic acid N-succinimidyl ester (55156, Sigma-Aldrich) or 12.5 µM AMCA-X-Succinimidyl Ester (P/N 90077, Biotium Inc., USA) in PBS for 15 minutes at 37° C. After staining the cells were washed for 5 minutes in PBS and mounted with PBS. Images was acquired with Xcyto®10 image cytometer (ChemoMetec A/S, Denmark) with 20× magnification using the UV bright field channel and the following combinations of LED light sources and emission filters; 405 nm LED with 452 nm (band pass: 430-475 nm) emission filter, 405 nm LED with 593 nm (band pass: 573-613 nm) emission filter, 488 nm LED with 534 nm (band pass: 513-555 nm) emission filter and 535 nm LED with 609 nm (band pass: 582-636 nm) emission filter. Image analysis, scaling and pseudo-colors was performed and adjusted in XcytoView™ (ChemoMetec A/S, Denmark).

Figure 6:
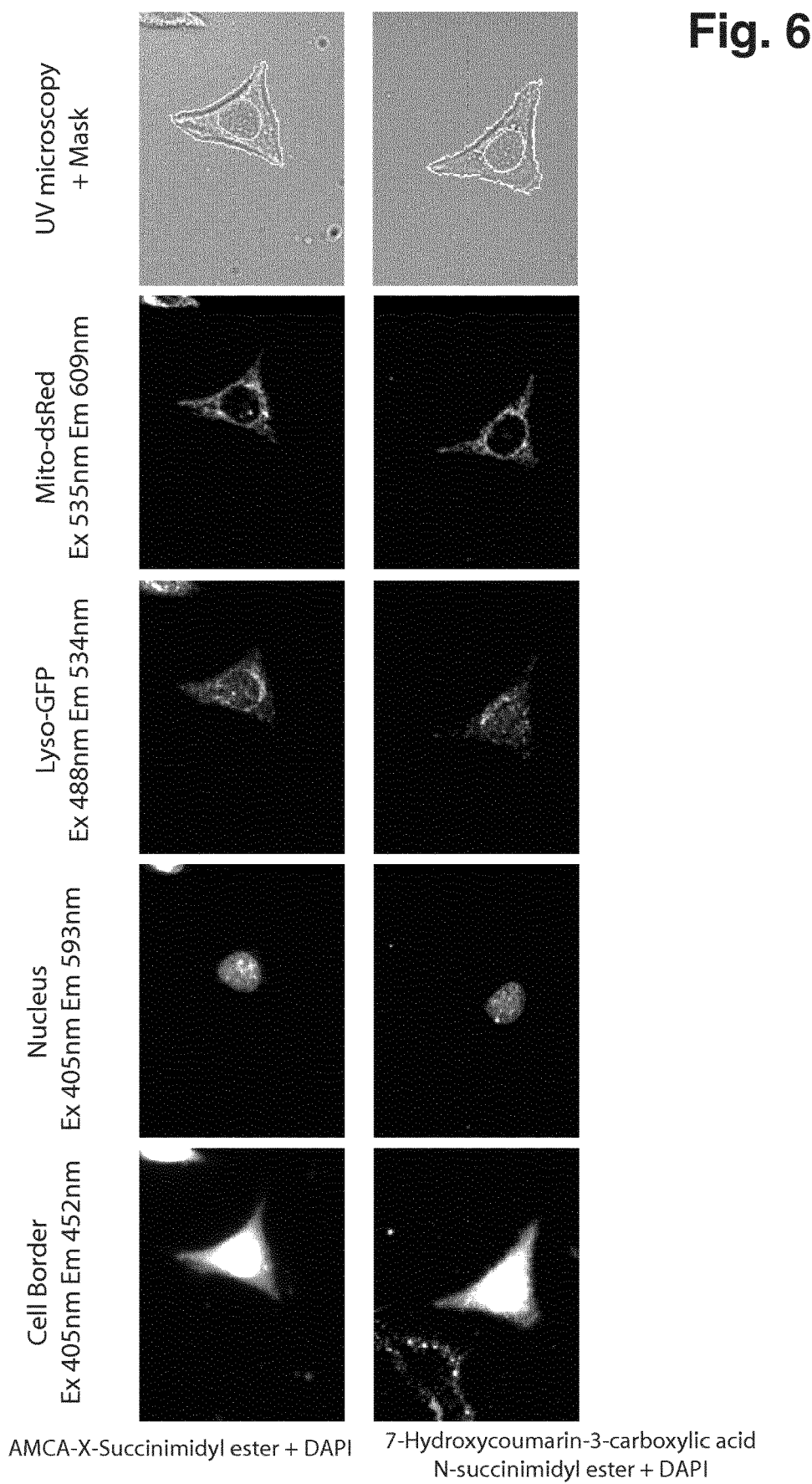
FIG. 6 illustrates live HeLa cells stably co-expressing Lyso-GFP and Mito-dsRED. The cells were gown on a glass surface and counterstained by combining a DNA dye with a cytoplasm dye as specified on the left panel of the figure.

The Single-EX fluorescence masking method was applied to live HeLa cells stably co-expressing Lyso-GFP and Mito-dsRED. The nucleus and the cytoplasm ere stained with spectrally overlapping dyes, where one dye stains the nucleus and one dye stains the cytoplasm. Based on the different emission spectra of the dyes the cytoplasm and nucleus could readily be identified, see FIG. 6. Thus, the Single-EX fluorescence masking method is compatible live cell imaging.

EXAMPLE 6

Single-Excitation Single-Emission Fluorescence Masking of U2OS Cells Using UV Activated Dye U2OS cells were maintained at 37° C. in a humidified atmosphere with 5% $CO_2$ in RPMI (61870, Gibco®, Thermo Fisher Scientific) supplemented with 8% Heat inactivated Fetal Bovine Serum (10500, Gibco®, Thermo Fisher Scientific). 3.75*$10^5$ cells were seeded in Ibidi 12-well slides (81201, Ibidi) and incubated overnight. The next day the adherent cells were washed in PBS and fixed in 10% neutral buffered formalin (NBF) for 15 minutes at room temperature and permeabilized in 0.1% Triton X-100 in PBS for 10 minutes at room temperature. Subsequently, the cells were washed in PBS and stained with 0.2 µM Maleimide-Abberior-CAGE-635 (1-0211-105, Abberior) and 0.5% Red-Dot™ 2 (P/N 40061, Biotium Inc., USA) in PBS for 30 minutes at room temperature. After staining the cells were washed for 5 minutes in PBS, and mounted with Vectashield mounting medium (H-1400, VECTOR LABORATORIES). Images was acquired with Xcyto®10 image cytometer (ChemoMetec A/S, Denmark) with 4× magnification using the UV bright field channel and the following combination of LED light source and emission filter; 635 nm LED with 685 nm (band pass: 665-705 nm) emission filter. The UV bright field channel was used to activate Maleimide-Abberior-CAGE-635 fluorescence. Image scaling and pseudo-colors was adjusted in XcytoView™ (ChemoMetec A/S, Denmark).

The nucleus and the cytoplasm were stained with two spectrally overlapping dyes, where one of the dyes only emits light upon UV activation. First an image was acquired using the 635 nm LED combined with 685 nm emission filter to image and determine the nuclei boundary stained by RedDot™ 2. Then Maleimide-Abberior-CAGE-635, that stains the cytoplasma, was activated by UV light and imaged with the same channel as used for determining the nuclei boundary, see FIG. 7. The two images, pre and post UV activation, provide all the information needed for cell segmentation using only one fluorescent channel. This is advantageously as it maximize the amount of free channels available for user-defined markers.

The invention claimed is:
1. A method for masking of a biological particle or element or region of a biological particle in a sample, the method comprising the steps of:

staining a first element or region of the biological particle with a first fluorescent dye, the first fluorescent dye characterized by a first excitation wavelength and a first emission wavelength;

staining a second element or region of the biological particle with a second fluorescent dye, the second fluorescent dye characterized by a second excitation wavelength and a second emission wavelength;

wherein the first and second excitation wavelengths are in an overlapping waveband region and the first and second emission wavelengths are in different waveband regions, placing the sample in an image cytometer, illuminating the sample with light, wherein the light generates a fluorescent light signal from the first and second fluorescent dyes, recording an image of the fluorescent light signal emitted from the sample, and determining boundaries of the biological particle or element or region of the biological particle based on the fluorescent light signal in the image.

2. The method according to claim 1, wherein a single light source is used to illuminate the sample.

3. The method according to claim 1, wherein the different waveband regions do not overlap.

4. The method according to claim 1, wherein determining boundaries of the biological particle or element or region of the biological particle further comprises determining the circumference of the biological particle or an element or region of the biological particle or the circumference of a boundary in the biological particle.

5. The method according to claim 1, wherein one or more elements or regions of the biological particle is nucleus, cytoplasm, mitochondria, golgi apparatus, lysosome, endoplasmic reticulum, vacuole, chloroplasts, flagellum, nucleolus, stress granule, cytoskeleton, centrosome, cell wall, cell membrane, nuclear membrane, or foci comprising biomolecules.

6. The method according to claim 1, wherein the biological particle is a cell and determining boundaries of the cell or element or region of the cell provides information relating to one or more of: status of the cell cycle, viability of the cell, vitality of the cell, size of the cell, and cell count.

7. The method according to claim 1, wherein the biological particle adheres to a surface, is in suspension, or has sedimented to be in close proximity to a surface of a sample compartment.

8. The method according to claim 1, wherein the second fluorescent dye is DAPI (4′,6-diamidino-2-phenylindole), Hoechst 33342, Hoechst 33258, Hoechst 34580, PI (Propidium Iodide, 3,8-Diamino-5-[3-(diethylmethylammonio) propyl]-6-phenylphenanthridinium diiodide), Deep Red Anthraquinone 7, or Deep Red Anthraquinone 5.

9. The method according to claim 1, wherein a peptide or azide, maleimide, succinimidyl ester, carbodiimide, carbonyl, diazirine, hydrazide, hydroxymethyl phosphine, imidoester, isocyanate, PFP-ester, psoralen, pyridyl disulfide, vinyl sulfone, or methanethiosulfonate, is conjugated to a fluorescent protein, a Quantum Dot, or a Lanthanide.

10. The method according to claim 1, wherein the biological particle is a cell having a membrane, wherein the first fluorescent dye binds to the membrane of the cell and wherein the second fluorescent dye binds to a different element or region of the cell.

11. The method according to claim 1, wherein the biological particle is a cell having a membrane and a nucleus, wherein the first fluorescent dye binds to the cytoplasm of a cell, and wherein the second fluorescent dye binds to the nucleus of the cell.

12. The method according to claim 1, wherein determining boundaries of the biological particle or element or region of the biological particle based on the fluorescent light signal in the image further comprises use of bright field, dark field, phase contrast, or light attenuation light information.

13. The method according to claim 1, wherein the light used to illuminate the sample is generated by a single light emitting diode.

14. The method according to claim 1, wherein the light used to illuminate the sample is generated by two or more light emitting diodes.

15. The method according to claim 1, wherein the optical magnification of the image cytometer is ×10 or less.

16. The method according to claim 1, wherein two images are used to determine boundaries of the biological particle or element or region of the biological particle.

17. The method according to claim 1, wherein two or more images are used to determine boundaries of the biological particle or element or region of the biological particle, where at least one image represents optical interference light signal.

18. The method according to claim 1, wherein the first fluorescent dye is a maleimide or succinimidyl ester conjugated a fluorescent moiety and the second fluorescent dye is DAPI.

19. The method according to claim 1, wherein the first fluorescent dye is AMCA-X N-succinimidyl ester (CAS No 216309-02-3) and the second fluorescent dye is Hoechst 33342, Hoechst 3325, or Hoechst 34580.

20. The method according to claim 1, wherein the first fluorescent dye is a maleimide ester conjugated a fluorescent moiety and the second fluorescent dye is a fluorescent DNA dye.

21. A method for masking of a biological particle or element or region of a biological particle in a sample, the method comprising the steps of:

staining a first element or region of the biological particle with a first fluorescent dye, the first fluorescent dye characterized by a first excitation wavelength and a first emission wavelength;

staining a second element or region of the biological particle with a second fluorescent dye, the second fluorescent dye characterized by a second excitation wavelength and a second emission wavelength;

wherein the first and second excitation wavelengths are in an overlapping waveband region and the first and second emission wavelengths are in an overlapping waveband region, placing the sample in an image cytometer, illuminating the sample with light, wherein the light generates fluorescent light signal from the first and second fluorescent dyes, recording an image of the fluorescent light signal emitted from the sample, and determining boundaries of the biological particle or element or region of the biological particle based on the fluorescent light signal in the image.

* * * * *